(12) United States Patent
Sathyanarayan

(10) Patent No.: US 7,444,319 B1
(45) Date of Patent: Oct. 28, 2008

(54) METHOD AND APPARATUS FOR EXTRACTING RELEVANT CONTENT BASED ON USER PREFERENCES INDICATED BY USER ACTIONS

(75) Inventor: Seshadri Sathyanarayan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 920 days.

(21) Appl. No.: 09/671,547

(22) Filed: Sep. 27, 2000

(51) Int. Cl.
*G06F 7/00* (2006.01)
*G06F 17/30* (2006.01)

(52) U.S. Cl. .................. 707/3; 707/2; 707/10

(58) Field of Classification Search .............. 707/5, 707/1–3, 6, 9, 4, 10, 100; 709/219
See application file for complete search history.

(56) References Cited

U.S. PATENT DOCUMENTS

| | | | |
|---|---|---|---|
| 5,717,923 A | | 2/1998 | Dedrick ............ 395/613 |
| 5,787,416 A | * | 7/1998 | Tabb et al. ............ 707/2 |
| 5,855,015 A | * | 12/1998 | Shoham ............ 707/5 |
| 6,018,619 A | * | 1/2000 | Allard et al. ............ 709/224 |
| 6,029,195 A | * | 2/2000 | Herz ............ 707/10 |
| 6,269,361 B1 | * | 7/2001 | Davis et al. ............ 707/3 |
| 6,292,796 B1 | * | 9/2001 | Drucker et al. ............ 704/9 |
| 6,363,377 B1 | * | 3/2002 | Kravets et al. ............ 707/4 |
| 6,421,675 B1 | * | 7/2002 | Ryan et al. ............ 707/100 |
| 6,460,060 B1 | * | 10/2002 | Maddalozzo et al. ...... 715/513 |
| 6,505,201 B1 | * | 1/2003 | Haitsuka et al. ............ 707/10 |
| 6,691,106 B1 | * | 2/2004 | Sathyanarayan ............ 707/3 |
| 6,968,332 B1 | * | 11/2005 | Milic-Frayling et al. ...... 707/3 |
| 7,181,438 B1 | * | 2/2007 | Szabo ............ 707/2 |

\* cited by examiner

*Primary Examiner*—Don Wong
*Assistant Examiner*—Merilyn P Nguyen
(74) *Attorney, Agent, or Firm*—Blakely, Sokoloff, Taylor & Zafman LLP (57) ABSTRACT

A method and apparatus are described for facilitating efficient retrieval and display of information to a computer user from sites on a network. An agent is described that monitors computer usage to determine the purpose or intent of a particular session. The agent analyzes information gathered during the monitoring to determine the user's purpose, and subsequently generates queries to search a plurality of network sites that may have information useful to the user related to the purpose. The queries are sent to the sites and when the search results are returned to the computer, the agent filters the search result entries to determine their relevance to the purpose. A summary document comprising the search result entries relevant to the users purpose is prepared and displayed to the user.

25 Claims, 6 Drawing Sheets

| EBAY | | |
|---|---|---|
| DIGITAL CAMERA NIKON COOLPIX 990 | | SEARCH |

EBAY SEARCH RESULTS 505

4 ITEMS FOUND FOR "DIGITAL CAMERA NIKON COOLPIX 990"

| ITEM # | ITEM | PRICE | END |
|---|---|---|---|
| 123 | NEW NIKON COOLPIX 990 DIGITAL CAMERA | $825.00 | 10/30 ← 570 |
| 126 | USED DIGITAL CAMERAS: NIKON COOLPIX 990 | $746.00 | 11/5 ← 511 |
| 137 | NIKON COOLPIX 990 DIGITAL CAMERA, NR | $724.00 | 11/9 ← 512 |

CDW
RESULTS CONTAINING "DIGITAL CAMERA NIKON COOLPIX"

CDW SEARCH RESULTS 520

| PRODUCT NAME | PRICE | |
|---|---|---|
| DIGITAL ACCESSORIES | | |
| NIKON COOLPIX 900 AC ADAPTER | $53.25 | ← 521 |
| NIKON COOLPIX 950 SERIAL CABLE | $35.24 | ← 522 |
| NIKON COOLPIX REMOTE CONTROL FOR 990 | $126.15 | ← 523 |
| HANDHELD DIGITAL CAMERA | | |
| NIKON COOLPIX 800 | $538.79 | ← 524 |
| NIKON COOLPIX 990 | $957.00 | ← 525 |

EPINIONS.COM
SEARCH RESULTS

EPINIONS SEARCH RESULTS 530

| 1. NIKON COOLPIX 990 | ************ | ← 531 |
|---|---|---|
| 2. NIKON COOLPIX 950 | ************ | ← 532 |
| 3. NIKON COOLPIX 800 | ************ | ← 533 |
| 4. NIKON COOLPIX 700 | ************ | ← 534 |

*FIG. 5*

AVAILABLE INFORMATION RELATING TO

DIGITAL CAMERA NIKON COOLPIX 990

| SITE | ITEM # | ITEM | PRICE | END |
|------|--------|------|-------|-----|
| EBAY | | | | |
| 1. | 123 | NEW NIKON COOLPIX 990 DIGITAL CAMERA | $825.00 | 10/30 |
| 2. | 126 | USED DIGITAL CAMERAS: NIKON COOLPIX 990 | $746.00 | 11/5 |
| 3. | 137 | NIKON COOLPIX 990 DIGITAL CAMERA, NR | $724.00 | 11/9 |
| CDW | | | | |
| 1. | 523 | NIKON COOLPIX REMOTE CONTROL FOR 990 | $126.15 | |
| 2. | 524 | NIKON COOLPIX 800 | $538.79 | |
| EPINIONS | | | | |
| 1. | 531 | NIKON COOLPIX 990 | ******** | |

*FIG. 6*

METHOD AND APPARATUS FOR EXTRACTING RELEVANT CONTENT BASED ON USER PREFERENCES INDICATED BY USER ACTIONS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of data extraction. More particularly, the invention relates to the extraction of data relevant to an interest of a user. The user interest is determined based on the actions of the user.

2. Description of the Related Art

The Internet and the World Wide Web have spawned an information revolution providing people with a single point of access to data and information on a wide variety of topics that previously required a person to consult with number of sources that were often located in multiple places. For example, a person desiring to purchase a camera today need only access the Web from his computer to gather information about the different cameras available, read reviews about the one or more cameras that meet his needs, locate vendors who carry the chosen camera, perform a price comparison among the vendors, and finally, purchase the camera. The entire process can be accomplished by a person without ever leaving his home and the camera will typically arrive within one to three days via the post office or some other package delivery service. In contrast, prior to the Web, a person would have to research the available camera choices by contacting camera stores located within his geographic region, more often than not traveling to various stores to view the various cameras and to gather literature. He might go to the library to consult photography magazines to read professional reviews. He might consult with his friends and colleges to see what camera they use. Next, he would visit or call the various vendors to find the one offering the best price, then travel to the chosen vendor to purchase the camera. In the end, the process would have taken several days, if not weeks, required a significant amount of the person's time, and cost the person money in terms of travel expenses.

Despite the above stated advantages offered by the availability of an enormous amount of online information, accessing the information still requires a relatively high degree of skill and luck on the part of the user. The user needs to know what web sites to go to locate certain types of information. Often a user will utilize a search engine (such as Lycos, or Alta Vista) or a web content listing service (such as Yahoo) to find information about a particular topic, but the quality of information retrieved by these types of services often depends on the service chosen and the quality of the search query. Once results are returned the user often has to shift through the results web page by web page to find one or more that have the desired information. The search process may need to be repeated multiple times for a given search area depending on the particular aspect of a topic that the user desires information about. For instance, with regard to the camera example, the person might run a search to first determine the cameras that are available and their specifications. Next, he might perform a search to find reviews of the one or more of the cameras to find out what owners and professional experts think of the product. Finally, he might do a search to find the online retailer that is selling the camera for the lowest price. Although the time taken to complete the research and make a purchase may be significantly shorter than the time involved using the traditional methodology described above, a significant amount of time may be required nonetheless, a large portion of the time being searching sources that have information relevant to the user and identifying relevant information.

SUMMARY

A method, and apparatus are described to extract relevant content from web sites based on user preferences. One described method includes monitoring usage during a session, recording information selected during the monitored session, analyzing the recorded information to determine a user interest for the session, and automatically generating a search engine query based on the determined interest. The method may further include transmitting the generated search engine query to a remote web site to query, and receiving query results from the remote web site based on the query.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus are described for extracting information relevant to the intent or purpose of a computer user based on that user's purpose or intent by automatically searching a number of sites on a network and filtering the results to maximize the relevance of the information presented to the user. In certain embodiments, an agent or software module monitors the activity of a computer user. For instance, the sites and information viewed by a user may be tracked. The agent then analyzes the information and determines the probable intent or purpose of the user. At some point in a computer session, either at the direction of the user or based on certain trigger parameters, one or more queries related to the user's intent or purpose are generated and sent to one or more network sites. The network sites may be predetermined in one embodiment or in other embodiments they may be chosen by the users. The queries are sent to the network sites and run. The results are returned to the user's computer for further filtering. The search result entries from each network site are compared with the original query to determine the relevance to the user's purpose or intent. In a preferred embodiment, those search result entries that meet a certain threshold are presented to the user, preferably in a document summarizing the results for all or most of the network sites queried. In alternative embodiments, the results of the querying and filtering processes may be presented in any number of ways that would be obvious to someone of ordinary skill in the art.

In the following description, for the purposes of explanation, numerous specific details are set forth in order to provide a thorough understanding of the present invention. The invention is described herein primarily in terms of a tool used to (1) determine the intent of a user, (2) to generate a query to various sites on the World Wide Web, and (3) provide the user with a summary of the search results provided by the queried sites. The invention is, however, not limited to this particular embodiment alone, nor is it limited to use in conjunction with any particular network environment such as the Internet or the World Wide Web. For example, the claimed method and apparatus may be used in conjunction with a company's internal network to assist the user in finding information or data related to a particular job function or task he is performing. It is contemplated that certain embodiments may be utilized outside of a network environment, wherein the queries are generated and searches performed relative to the storage devices within the users computer. In this vain, the detailed description provided herein is not intended to limit the scope of the invention as claimed. To the contrary, embodiments of the claims have been contemplated that encompass the full breadth of the claim language. Accordingly, the present invention may be practiced without some of the specific detail provided herein.

The present invention includes various operations which will be described below. The operations of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Exemplary Operating Environment

Figure 1:
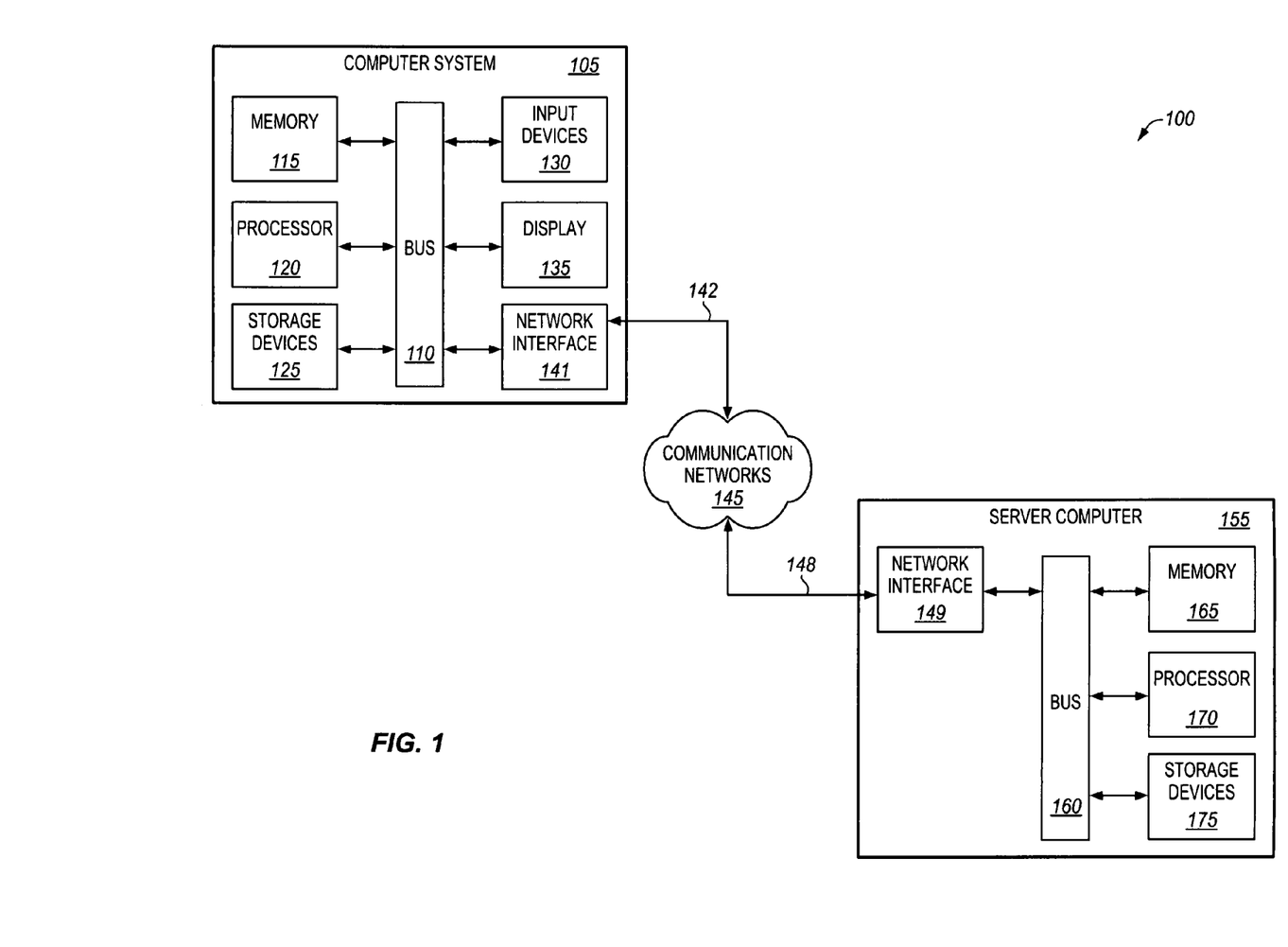
FIG. 1 is a block diagram of an exemplary operating environment in which embodiments of the invention may be practiced.

FIG. 1 illustrates an exemplary operating environment 100 for the invention. A computer system 105, communications network 145, and server computer 155 are shown. In one embodiment of the invention, a computer user would use the computer system 105 to access other computers such as server computer 155 to obtain information and services related to a task being performed. Software running on the computer system would monitor the activities performed by the computer user.

The computer system 105 comprises any standard or specialized computer platform. The computer system 105 comprises memory 115, a processor 120, storage devices 125, input devices 130, a display 135, and a network interface 141 which are electrically coupled via a bus 110. Network interface 141 is connected to a communications network 145 (e.g., one or more networks, including, but not limited to the Internet, private or public telephone, cellular, wireless, satellite, cable, local area, metropolitan area, and/or wide area networks) over connection 142. Memory 115 is one type of computer-readable medium, and typically comprises random access memory (RAM), read only memory (ROM), integrated circuits, and/or other memory components. Memory 115 typically stores computer-executable instructions to be executed by processor 120 and/or data, which are manipulated by processor 120 for implementing functionality in accordance with the invention. Storage devices 125 are another type of computer-readable medium, and typically comprise hard disk, CD, DVD, tape, and floppy disk drives and networked services. Storage devices 125 typically store computer-executable instructions to be executed by processor 120 and/or data, which are manipulated by processor 120 for implementing functionality in accordance with the invention.

As used herein, computer-readable medium is not limited to memory and storage devices; rather, computer-readable medium is an extensible term including other storage and signaling mechanisms, including interfaces and devices such as network interface cards and buffers therein, as well as any communications devices and signals received and transmitted, and other current and evolving technologies that a computerized system can interpret, receive, and/or transmit.

Server computer 155 typically comprises one or more standard or specialized computer platforms (e.g., a computer platform optimized for retrieving information and sending information to clients). For simplicity, only one server computer 155 is depicted in FIG. 1. However, the number of server computers contemplated by the invention is unbounded. A server computer 155 may have stored thereon information, which may be accessed by the user of computer 105 over the communications network 145. For example, when the communications network 145 comprises the Internet, the server computer 155 may store data related to one or more web sites.

A server computer 155 typically comprises memory 165, a processor 170, storage devices 175, and a network interface 149, which are electrically coupled via a bus 160. Network interface 149 is connected to communications network 145 (e.g., Internet, email network, private or public network) over a public or private telephone, cellular, wireless, satellite, local area and/or wide area network connection 148. Memory 165 is one type of computer-readable medium, and typically comprises random access memory (RAM), read only memory (ROM), integrated circuits, and/or other memory components. Memory 165 typically stores computer-executable instructions to be executed by processor 170 and/or data that is manipulated by processor 170 for implementing the server functionality. Storage devices 175 are another type of computer-readable medium, and typically comprise hard disk, CD, DVD, tape, and floppy disk drives and networked services. Storage devices 175 typically store processor-executable instructions and/or data, which can be manipulated by processor 170.

An Exemplary Software Architecture

Figure 2:
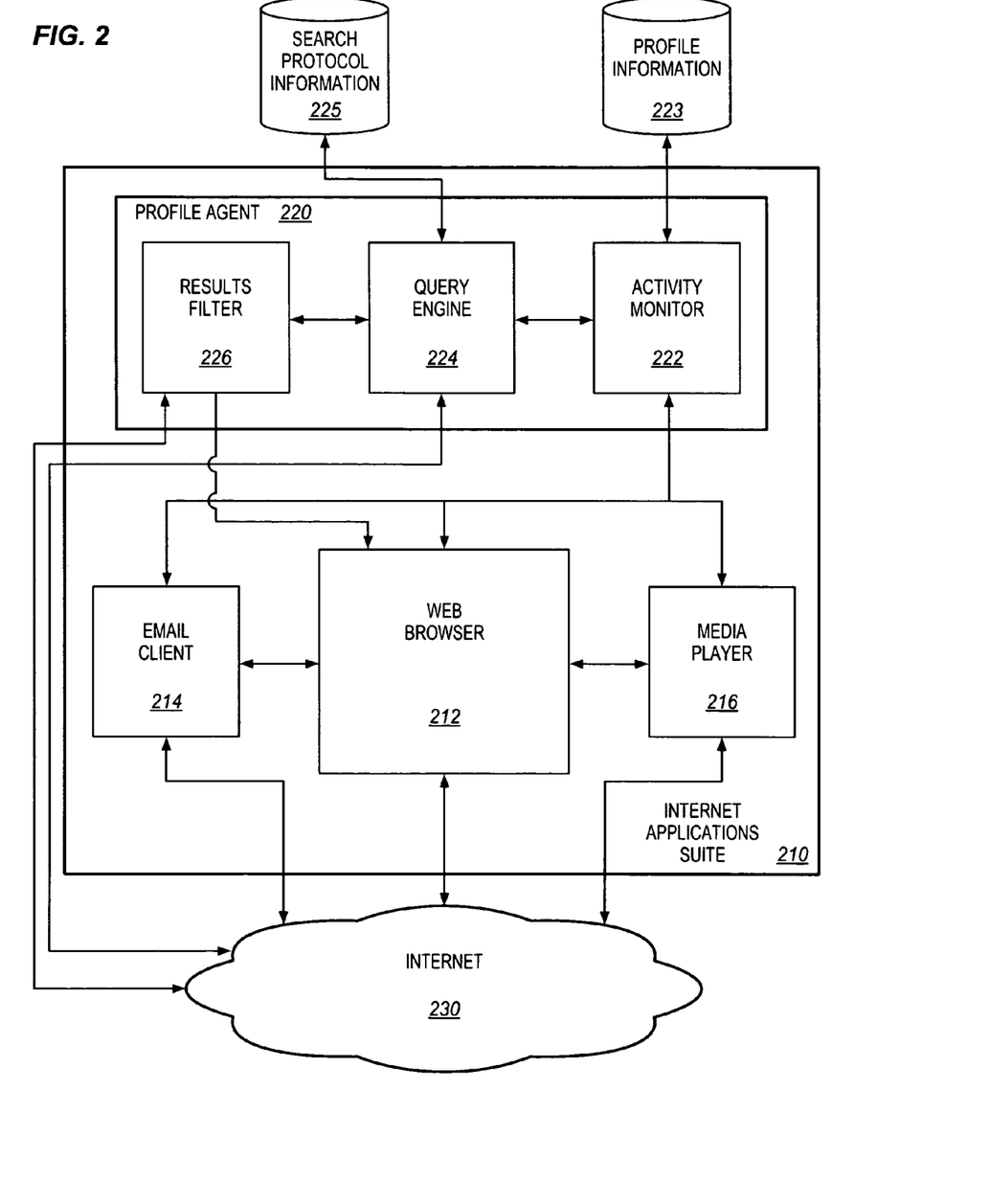
FIG. 2 is a block diagram of an exemplary software architecture for one embodiment of the invention.

FIG. 2 is a block diagram of exemplary software architecture for one embodiment of the invention. An Internet Applications Suite 210 comprises a number of applications and modules and serves as the software link between computer system 105 and an intranet or the Internet 230. The Internet Application Suite 210 may center around a Web Browser 212. The Web Browser 212 serves as the primary interface with the Internet 230 and the user of computer system 105. In a typical computer system, it is through the web browser 212 that pages and documents encoded in a markup language, such as HTML or XML, from various web sites are displayed on a computer monitor. These displayed pages typically include hypertext or graphical links to other pages that may be retrieved by selecting the links by way of an input device 130 such as a mouse. The web browser 212 utilizes the Hypertext Transfer Protocol (HTTP) and Uniform Resource Locators (URLs) to access specific web sites and pages contained therein and retrieve them for computer system 105, often for display to the computer user. In alternative embodiments, web browsers are contemplated that do not rely on monitors or visual displays to communicate information and data to a user. For example, a web browser's interface with the user may be speech based.

The suite 210 may also include an email client 214 to receive and send email to and from the Internet. The email client may have its own interface with the Internet 230 as shown in FIG. 2 or it may utilize the web browser's 212 interface with the Internet 230. Furthermore, email client 214 may have its own interface with the computer user, or it may generate markup language pages for display on the web browser's 212 interface. Suite 210 may also include a media player, such as the Microsoft Media Player or Real player from Real Labs, to receive, decode, and display multimedia content from a site on the Internet. Like the email client 214, the media player 216 may have its own interfaces with the Internet and the user, or it may utilize the interfaces provided by the web browser 212.

The suite 210 may also include a profile agent 220 as shown in FIG. 2 comprising 1) an activity monitor 222, 2) a query engine 224, and 3) a results filter 226. The activity monitor 222 monitors the user's activities on the Internet via the web browser 212, the email client 214, and/or the media player 216 to determine the particular intent or purpose of a particular Internet session. For example, the activity monitor 222 may record the content of all hypertext links chosen by the user and store them as profile information 223. Subsequently or concurrently, the activity monitor 222 may analyze the profile information using heuristics or other methods. The profile information 223 may also include other information such as an interest profile about the user and keyword tables comprising words that may be indicative of intent or purpose (for example, a link containing "digital imaging" may be considered indicative of an interest in digital cameras).

At the direction of the users or automatically at the occurrence of certain trigger events, a query engine 224 may be utilized to generate queries to search various web sites based on the intent or purpose of the user as determined by the activity monitor 222. The web sites queried may be part of a particular group partnered with the provider of suite 210 or they may be chosen by the user, either relative to a particular purpose or intent or when configuring the suite 210. The web sites queried by the query engine 224 may also vary depending on the nature of the user's intent or purpose. The particular search protocol information 225 related to the particular web sites, as well as any indicators of which web site to search, are stored to be accessed, as necessary, by the query engine 224.

The query engine 224 will typically comprise an interface for accessing the web sites through the Internet.

The results of the search are received by a results filter 226. The results will typically comprise a document or HTML page containing a listing of search result entries for each web site queried. The results filter 226 compares each entry of each page received from the web sites with the query to determine a degree of match between the two. Typically, the search result entries are each associated with a particular web page and provide an HTTP link to the associated web page. These links may have elements or words that match the words or elements of the query. In some embodiments, the results filter 226 utilizes these links to perform the comparison with the query. In other embodiments, the results filter 226 may use any descriptive material associated with a search result entry to perform the comparison. In a preferred embodiment, once the number of results is winnowed down to those result entries that are most pertinent to the user's purpose or intent, a document is generated containing the pertinent entries for each of the multiple web sites queried. In alternative embodiments, it is contemplated that the results filter may access the pages associated with an entry to determine a degree of match with the user's purpose. Furthermore, in some embodiments, the results filter 226 may generate a document containing information contained within the pages associated with the search result entries rather than return the search result entries alone.

It is to be understood that there are a large number of software architectures that could be utilized to provide similar functionality as the architecture discussed supra. In this vain, the software architecture of FIG. 2 is to be considered merely exemplary. For example, all or some of the functions discussed above as being separate and distinct elements of the Internet Suite 210 might be accomplished by a single integrated software application. Many other architectures are contemplated that would be obvious to someone of ordinary skill in the art.

An Exemplary Flow Diagram

Figure 3:
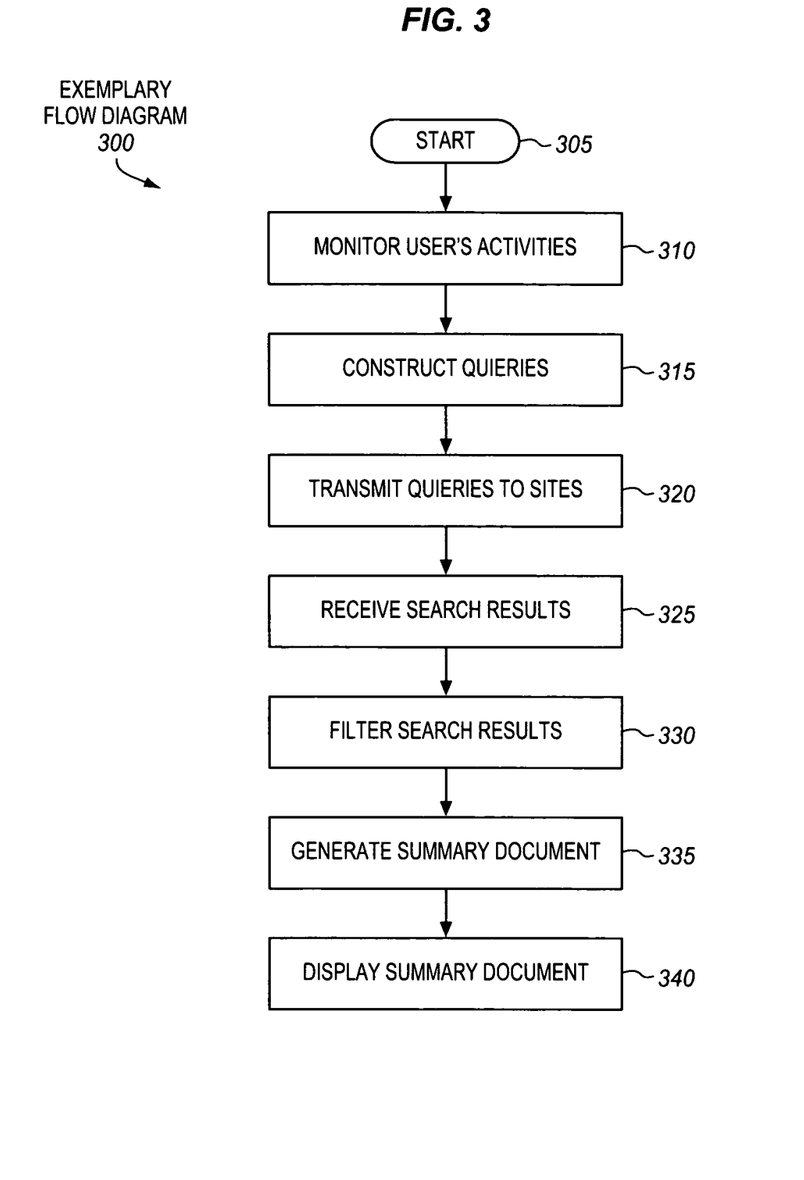
FIG. 3 illustrates a flow chart for an exemplary embodiment of the invention.

FIG. 3 illustrates a flow chart for an exemplary embodiment of the invention. Block 305 indicates the start of the exemplary process. The monitoring process may be initiated by an affirmative action on part of a user. For instance, the user may click on a particular icon on his computer screen indicating he desires to have his activities monitored. Alternatively, the program may automatically monitor the activities of a user whenever the Internet Application Suite had been activated.

The activities of the user are monitored as indicated by block 310. In a preferred embodiment, an activity monitor 222 monitors the hypertext associated links chosen by a user during a surfing session. Alternatively, the activity monitor 222 may monitor the content of the pages viewed by a user. In assessing the relevance of a particular page, it may factor any number of factors including but not limited to the time spent at a particular page, whether the page is book marked, how often the particular page is visited, and activities performed on or at the page. In one embodiment, the user could during the monitoring session, indicate to the activity monitor 222 that a particular page and/or item is of interest, in which case the activity monitor 222 would gather the appropriate information about the page. Other methods of monitoring the activity of a user are possible as would be obvious to someone of ordinary skill in the art. Furthermore, it is contemplated that the activities performed by the user other than those related to network activity might also be monitored to determine the purpose or intent of the user.

In one embodiment, the activity monitor 222 is able to determine a shift in the interest of the user based on a change in the information contained within the monitored actions. For example, if the user is surfing sites associated with digital photography, and after a certain period switches to surfing web pages related to financial matters, the activity monitor 222 may be able to detect the change based on category profiles containing keywords related to different categories of interests stored as profile information 223. Alternatively, in another embodiment, the user may click on an icon to begin a new monitoring session with regard to a new intent or purpose.

Utilizing the collected data the activity monitor 222 determines the purpose or intent of the user's Internet session. This may be determined using any number of known methods, such a statistical analysis, and heuristics. Once an intent or purpose is determined, queries can be constructed and sent to other web sites to gather information related to the user's purpose as indicated by block 315. The generation of queries might be automatic once an intent or purpose is derived by the activity monitor 222 or the queries may be generated in response to an explicit indication by the user for more information. For instance, in one embodiment, the activity monitor 222 may display in a text box at the top or bottom of the screen a set of words it has determined are indicative of the user's current purpose. The user may then be able to indicate a desire to receive additional information regarding the displayed purpose by clicking on a button associated with the text box.

Figure 4:
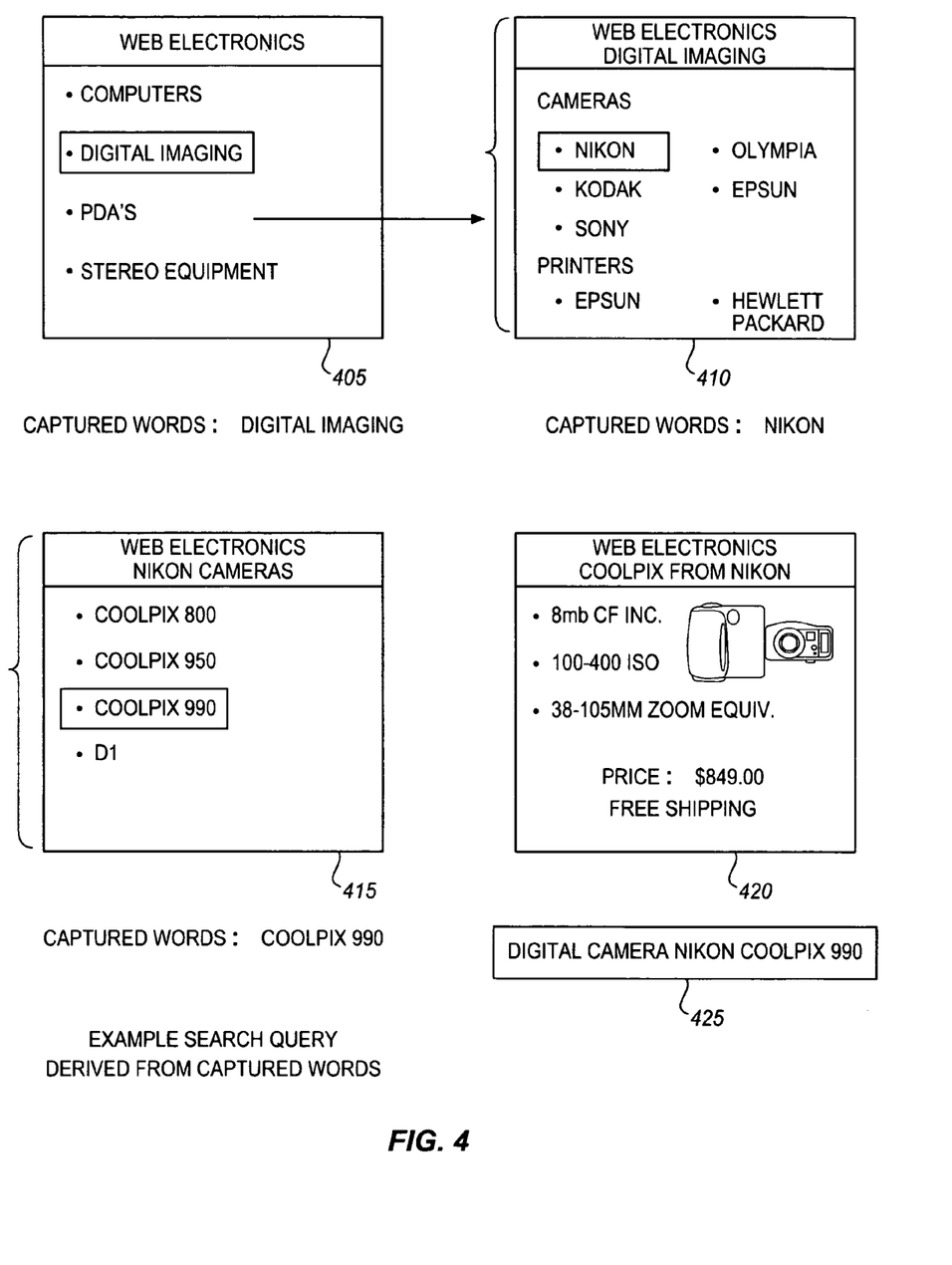
FIG. 4 illustrates a simple example of how web surfing activity may be used to derive the purpose of the user's surfing activities and generate a query associated with the derived purpose according to one embodiment of the invention.

FIG. 4 provides a simple example of how the profile agent 220 may derive the purpose of the user's surfing activities and generate a query associated with the derived purpose. In the FIG. 4 example, a hypothetical user has an interest in finding information about the Nikon Coolpix 990® digital camera. He first clicks an icon on the browser's control panel or elsewhere on his display to start a new monitoring session. He first surfs to a Web-based merchants homepage 405 whom he knows or believes sells digital cameras. Here, he sees that the merchant sells digital cameras and that the merchant has a hypertext link to a digital imaging page. He selects the "digital imaging" link. The activity monitor 222 captures the words "digital imaging" and stores the information. The digital cameras page 410 is displayed within the user's browser. Here the user sees that the merchant carries Nikon brand digital cameras and he selects the "Nikon" link. The activity monitor 222 captures the word "Nikon" from the hypertext link and stores the information. Next, a list of Nikon cameras available from the merchant are displayed in the browser as shown by page 415. The user selects the "Coolpix 990" link, the associated page 420 is retrieved, and the words "Coolpix 990" are captured by the activity monitor 222. Box 425 indicates a query that might be generated by the query engine 224 after the captured words are analyzed. Note that the word "camera" is specified in the query 425. Based on the analysis performed on the captured words, the profile agent 220 may have determined that the user was interested in a camera based on the heuristic analysis of the captured words and comparison of the captured words with the appropriate stored category profile contained with the profile information 223. It may have determined based on stored information that "camera" is more indicative of the user's purpose or intent than the word "imaging." The activity monitor 222 may also have captured the content of the viewed pages and determined that "camera" appeared on the selected pages with increasing frequency as the surfing progressed, thereby indicating a probable interest in cameras. It is to be noted that the example presented herein with regard to a computer user interested in a digital camera is merely an example to help clearly present and explain the embodied invention and is not to be construed as indicating the exact method in which a profile agent would determine a user's purpose or intent during a surfing session; rather, it is understood that any one of many methods of content analysis known to one skilled in the art may be utilized in embodiments of the claimed invention.

As shown in block 315 and mentioned supra, queries are constructed for various network sites based on the derived purpose of the user. The sites selected by the query engine 224 to send queries may be predetermined by the vendor of the software based on agreements between the vendor and the sites. Typical sites may include merchant sites, auctions sites, news sites, review sites, and financial sites to name a few. In some embodiments, the query engine 224 will determine which sites to send a query based on the purpose of the user. For instance, in the digital camera example, it is unlikely that a query sent to a financial site, such as Hoovers.com, would prove useful to the user. Alternatively, the sites may be selected by the user, either from a list provided when the decision to query sites based on the ascertained purpose is made, or at some earlier period when the user is configuring the suite 210.

In any case, the query engine 224 has access to stored search protocol information 225 for all applicable sites so that it may generate queries to the sites. In many cases, a query will be in the form of a CGI script such as the example listed below:

http://www.epinions.com/search.html?search=Nikon+Coolpix+950+Digital Digital+Camera.

The query is then transmitted over the network to the targeted sites as shown in block 320.

Figure 5:
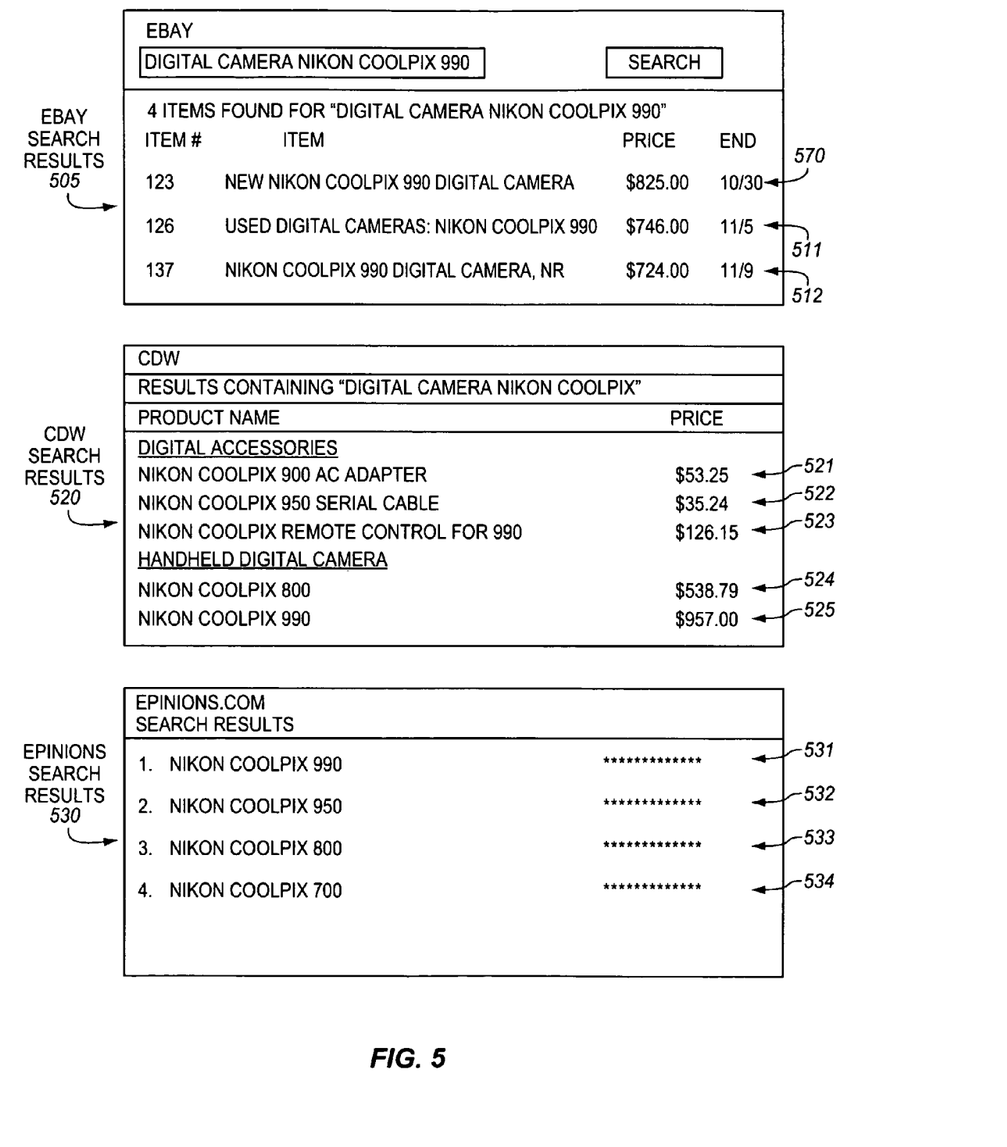
FIG. 5 is an illustration of web pages that may be returned from various sites as a request of the example query of FIG. 4.

Search results are transmitted from each of the applicable sites to the computer system 105 and received by the results filter 226 in block 325. Typically, the results are in the form of markup language documents comprising a number of search result entries. Generally, each entry will describe and be associated with another page. A hypertext link to the associated page will be provided. Examples of search results that might be returned for the digital camera example of FIG. 4 are shown in FIG. 5. The query engine 224 may obtain search results 505 for an auction service such as eBay™ to provide the user with information about the current auction price for new and used Coolpix 990 cameras and associated accessories. The search result entries 510-512 provide information about items currently being auctioned at that site. The query engine 224 may obtain search results 520 for one or more online merchants such as CDW™ to find out whether the merchant carries the camera, the current offer price, and accessories available for the camera as shown by the entries 521-525. The query engine 224 may obtain search results 530 from an online product review site such as Epinions™. The search result entries 531-534 indicate that the site has reviews from a number of consumers on a number of Nikon digital cameras. Additionally, search results may be obtained from any number of other sites.

It is common that the entries returned by the site search engines may include links to sites that are not directly related to the user's purpose. For instance, as shown in FIG. 5, the query of FIG. 4 returned a number of entries from the CDW and Epinion sites that related to cameras other than the Nikon Coolpix 990. For instance search results entries 521, 522, 532-34 all relate to other models of Nikon digital cameras. Such entries are presumably not of interest to the user and there would be little value in displaying them to the user who would be likely to ignore the entries or worse, waste time reviewing the entries. Therefore, in certain embodiments of the claimed invention, each page of search results is not displayed to the user. Rather, as indicated in FIG. 3 block 330, the search result entries from each page are filtered to identify only those search result entries that are most pertinent to the purpose of the user.

In one preferred embodiment, the results filter 226 compares at least a portion of each search entry result of each search result page with the words or elements contained in the query. The text link of the search result entries may be parsed into constituent words or elements and compared to the query to determine how many of the words or elements match. If the match exceeds a certain threshold the applicable search result entry may be tagged for display to the user. Additionally, the descriptions associated with the search result entries, as applicable, may be parsed into constituent elements and compared with the elements of the query. The entries in which the element matches a first threshold value as well as those entries in which the frequency of matching elements exceeds another threshold may be tagged for display. Any number of other different heuristic and algorithmic filtering methods and filtering criteria may be employed to winnow down the number of search result entries and identify those most pertinent to the user as would be obvious to one skilled in the art with the benefit of this disclosure. For instance, in an alternative embodiment, it is contemplated that the query engine 224 may retrieve the page associated with each search result entry and perform the comparison with the query on the elements contained within the page.

Figure 6:
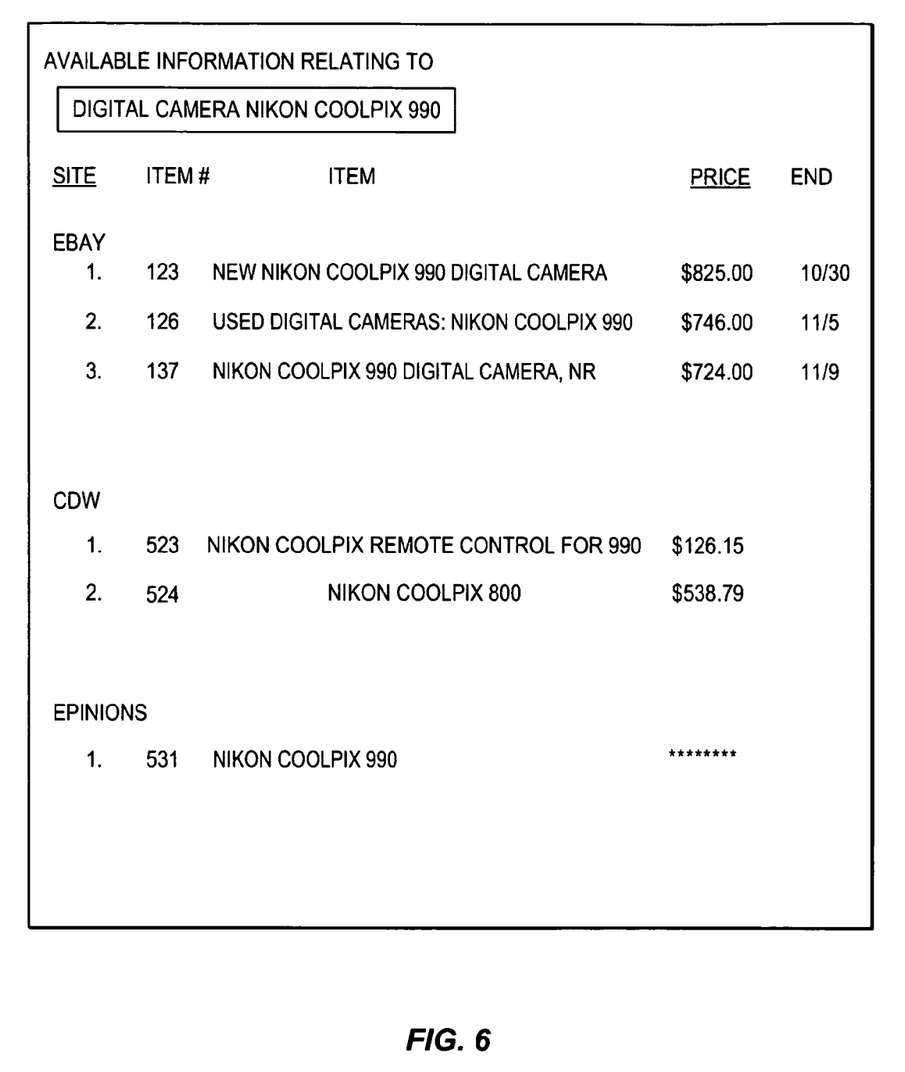
FIG. 6 is an illustration of a summary document that may be generated from search results illustrated in FIG. 5 according to one embodiment of the invention

Next as shown in block 335, a summary document is generated comprising the entirety or a portion of each of the tagged search result entries for the sites queried that returned relevant search result entries. In some embodiments, the entire tagged search result entry may be presented, or in other embodiments, only the link to an associated page may be displayed. Any description associated with a tagged search result entry may be edited for space considerations. In a preferred embodiment, the summary document comprises a single page summarizing the information available on a number of sites related to the user's purpose and providing links to the relevant information. In alternative embodiments, the document may comprise multiple linked pages; it may also include information culled from the pages associated with particular search result entries, or the results filter may retrieve the pages of information related to tagged search result entries for viewing by the user. The filtered information may be presented to the user in any number of formats as can be appreciated by one skilled in the art. Finally, as shown in block 340, the document is displayed to the user. FIG. 6 is an example summary document comprising a single page with provided links to the filtered information that is based on the hypothetical search result entries illustrated in FIG. 5.

ALTERNATIVE EMBODIMENTS

The invention has been described above primarily in terms of a user researching a product for purchase on the World Wide Web. The invention as embodied by the claims is not limited to use in researching products, nor is it limited to use in conjunction with the Internet. For instance, the claimed invention might be utilized when performing financial research on securities. It could be utilized to ascertain when a user needs help or assistance in performing certain tasks associated with hardware or software to provide the user with answers to resolve the ascertained problem.

Additionally, the claimed invention could be utilized in conjunction with a closed network or a computer system's resident data storage device by employees performing a certain task, wherein the invention would provide users with additional information contained on the network or within the storage devices that might assist employees in completing his task. The foregoing description has discussed the software associated with the invention as being part of an Internet application suite or similar. It is understood, however, that the invention need not be limited to specific application. For example, in certain embodiments the invention could be part of an operating system that monitors all of the user's activities to provide assistance when prompted to do so or automatically. Numerous other embodiments that are limited only by the scope and language of the claims are contemplated as would be obvious to someone possessing ordinary skill in the art and having the benefit of this disclosure.

The embodiments of the invention described heretofore relate are described and illustrated in the context of web pages displayed on a computer monitor. It is understood that the invention as a whole is not limited to this format of information display. For instance, embodiments of the invention could be utilized with voice-based systems, including telephones, wherein the results of the filtering process are broadcast to the user. Furthermore, embodiments of the invention are contemplated for use in a wide variety of network ready devices including but not limited to PDA's, wireless devices such as pagers and telephones, and television-based web devices.

What is claimed is:

1. A method comprising:
    monitoring usage of a web browser of a computer by a computer user during a usage session;
    recording information at the computer including hypertext links selected by the user during the monitored session;
    analyzing the recorded hypertext links at the computer to determine user interest for the session;
    automatically generating a search engine query by the computer based on the determined interest;
    transmitting the generated search engine query from the computer to at least one remote web site to query the at least one remote web site; and
    receiving query results at the computer from the at least one remote web site based on the query.

2. The method of claim 1, wherein analyzing comprises parsing hypertext links selected by the user into words and determining the user interest based on the parsed words.

3. The method of claim 1, wherein determining the user interest comprises determining the user interest based on the content of the hypertext links using heuristics.

4. The method of claim 1, wherein analyzing comprises applying the hypertext links to keyword tables stored in the computer, the keyword tables comprising words that are indicative of the user interest.

5. The method of claim 1, further comprising displaying a set of words to the computer user indicative of the determined user interest and displaying a button for the user to click on to indicate a desire to receive information regarding the displayed set of words.

6. The method of claim 1, further comprising displaying an icon to the computer user for the user to click on to start the usage session.

7. The method of claim 1, further comprising determining a change in the user interest by comparing recorded information to category profiles stored in the computer.

8. The method of claim 1, wherein monitoring further comprises at least one of:
    monitoring time spent at a network site;
    monitoring network pages bookmarked by the user;

monitoring frequency that particular network pages are visited; and monitoring the content of visited network pages, and wherein analyzing comprises analyzing the recorded information and the hypertext links to determine a user interest for the session.

9. The method of claim 1, wherein generating the query is in response to a user action and is based on the content of an item or a document currently being displayed.

10. The method of claim 1, wherein generating a search engine query comprises constructing queries to perform searches using search engines on a plurality of web sites based on the user interest, the method further comprising transmitting the queries to the plurality of web sites.

11. The method of claim 10, further comprising receiving search result documents from the web sites, the search result documents comprising a plurality of search result entries, filtering the search result entries based on the determined interest, and selecting a subset of the search result entries based on the filtering.

12. A computer-readable memory medium having stored thereon data representing instructions which, when executed by a computer, cause the computer to perform operations comprising:

monitoring usage of a web browser of a computer by a computer user during a usage session;

recording information at the computer including hypertext links selected by the user during the monitored session;

analyzing the recorded hypertext links at the computer to determine a user interest for the session;

automatically generating a search engine query by the computer based on the determined interest;

transmitting the generated search engine query from the computer to at least one remote web site to query the at least one remote web site; and receiving query results at the computer from the at least one remote web site based on the query.

13. The medium of claim 12, wherein the instructions for analyzing comprise instructions which, when executed by the computer, cause the computer to perform further operations comprising parsing hypertext links selected by the user into words and determining the user interest based on the parsed words.

14. The medium of claim 12, wherein the instructions for analyzing comprise instructions which, when executed by the computer, cause the computer to perform further operations comprising applying the hypertext links to keyword tables stored in the computer, the keyword tables comprising words that are indicative of the user interest.

15. The medium of claim 12, further comprising instructions which, when executed by the computer, cause the computer to perform operations comprising displaying a set of words to the computer user indicative of the determined user interest and displaying a button for the user to click on to indicate a desire to receive information regarding the displayed set of words.

16. The medium of claim 12, wherein the instructions for generating the query are executed in response to a user action and based on the content of an item or a document currently being displayed.

17. The medium of claim 12, wherein the instructions for generating a search engine query comprise instructions which, when executed by the computer, cause the computer to perform further operations comprising constructing queries to perform searches using search engines on a plurality of web sites based on the user interest, and wherein the instructions further comprise instructions for transmitting the queries to the plurality of web sites.

18. A computer system comprising:

a processor;

a network connection;

an activity monitor to monitor computer usage of a web browser of the computer system by a computer user during an Internet session, to record information at the computer system including hypertext links selected by the user during the monitored session, and to analyze the recorded hypertext links at the computer system to determine a user interest for the session; and a query engine to automatically generate search engine queries at the computer system based on the user interest, to transmit the queries from the computer system to search engines on a plurality of remote Internet web sites, and to receive query results at the computer system from the plurality of remote web sites based on the automatically generated query.

19. The system of claim 18, wherein the activity monitor parses hypertext links selected by the user into words and determines the user interest based on the parsed words.

20. The system of claim 18, wherein the activity monitor comprises keyword tables stored at the computer system and analyzes the hypertext links by comparing the hypertext links to the keyword tables to identify words that may be indicative of the user interest.

21. The system of claim 18, wherein the activity monitor records at least one of time spent at a network site, network pages bookmarked by the user, frequency that particular network pages are visited, and the content of visited network pages, and the activity monitor analyzes the recorded information and the hypertext links to determine a user interest for the session.

22. The system of claim 18, further comprising a results filter to receive a search result document from queried search engines, the search result document comprising a plurality of search result entries, the results filter to filter the search result entries based on the determined interest, and select a subset of the search result entries.

23. The system of claim 18, wherein the activity monitor determines the user interest based on the content of the hypertext links using heuristics.

24. The system of claim 18, wherein the activity monitor comprises category profiles stored at the computer system and determines a shift in the user interest by comparing recorded information to the stored category profiles.

25. The system of claim 18, wherein the query engine constructs queries to perform searches using search engines on a plurality of web sites based on the user interest, and transmits the queries to the plurality of web sites.

* * * * *